United States Patent
Alleston et al.

(10) Patent No.: US 7,447,441 B2
(45) Date of Patent: Nov. 4, 2008

(54) SIGNAL TRANSMISSION APPARATUS AND A METHOD OF SIGNAL TRANSMISSION

(75) Inventors: Steven Alleston, Leamington Spa (GB); Paul Harper, Leamington Spa (GB); Donald Govan, Leamington Spa (GB); Nicholas John Doran, Stratford-on-Avon (GB)

(73) Assignee: Ericsson AB, Stockholm (SE)

( * ) Notice: Subject to any disclaimer, the term of this patent is extended or adjusted under 35 U.S.C. 154(b) by 528 days.

(21) Appl. No.: 10/498,607

(22) PCT Filed: Nov. 27, 2002

(86) PCT No.: PCT/GB02/05324

§ 371 (c)(1),
(2), (4) Date: May 3, 2005

(87) PCT Pub. No.: WO03/050983

PCT Pub. Date: Jun. 19, 2003

(65) Prior Publication Data

US 2005/0226632 A1    Oct. 13, 2005

(30) Foreign Application Priority Data

Dec. 12, 2001  (GB)  ................................. 0129716.7

(51) Int. Cl.
*H04B 10/00* (2006.01)
*H04B 10/12* (2006.01)

(52) U.S. Cl. ....................... 398/152; 398/149

(58) Field of Classification Search ............... 398/152, 398/149; 359/483, 489, 490, 494, 495, 498, 359/501, 505
See application file for complete search history.

(56) References Cited

U.S. PATENT DOCUMENTS

| | | | |
|---|---|---|---|
| 5,524,144 A | 6/1996 | Suzuki | |
| 6,823,142 B1 * | 11/2004 | Tanaka et al. | 398/152 |
| 7,068,944 B2 * | 6/2006 | Sorin | 398/152 |
| 2002/0149823 A1 | 10/2002 | Bergano et al. | |

FOREIGN PATENT DOCUMENTS

| | | |
|---|---|---|
| EP | 0 562 514 B1 | 12/1998 |
| EP | 1 133 083 A2 | 9/2001 |
| EP | 1 180 861 A2 | 2/2002 |
| GB | 2 267 405 A | 12/1993 |
| WO | WO 01/48541 A2 | 7/2001 |
| WO | WO 01/67644 A1 | 9/2001 |

\* cited by examiner

*Primary Examiner*—M. R. Sedighian
(74) *Attorney, Agent, or Firm*—Kirschstein, et al.

(57) ABSTRACT

An apparatus and method of transmitting a plurality of polarized signals having different wavelengths through a length of signal transmission cable which changes the polarization of the signals in correspondence with their amplitudes and wavelengths. A dynamic filter capable of differential adjustment of the amplitudes of the signals and a polarizing element are provided in series with the length of signal transmission cable and the amplitudes of the different wavelength signals are so adjusted that the polarization states of the signals move towards alignment with the low-loss axis of the polarizing element. An advantage provided by the apparatus and method is that the high-amplitude signals are aligned with the low-loss axis of the polarizing element while low-amplitude noise is aligned with the high-loss axis of the polarizing element, resulting in an improvement in signal-to-noise ratio.

9 Claims, 1 Drawing Sheet

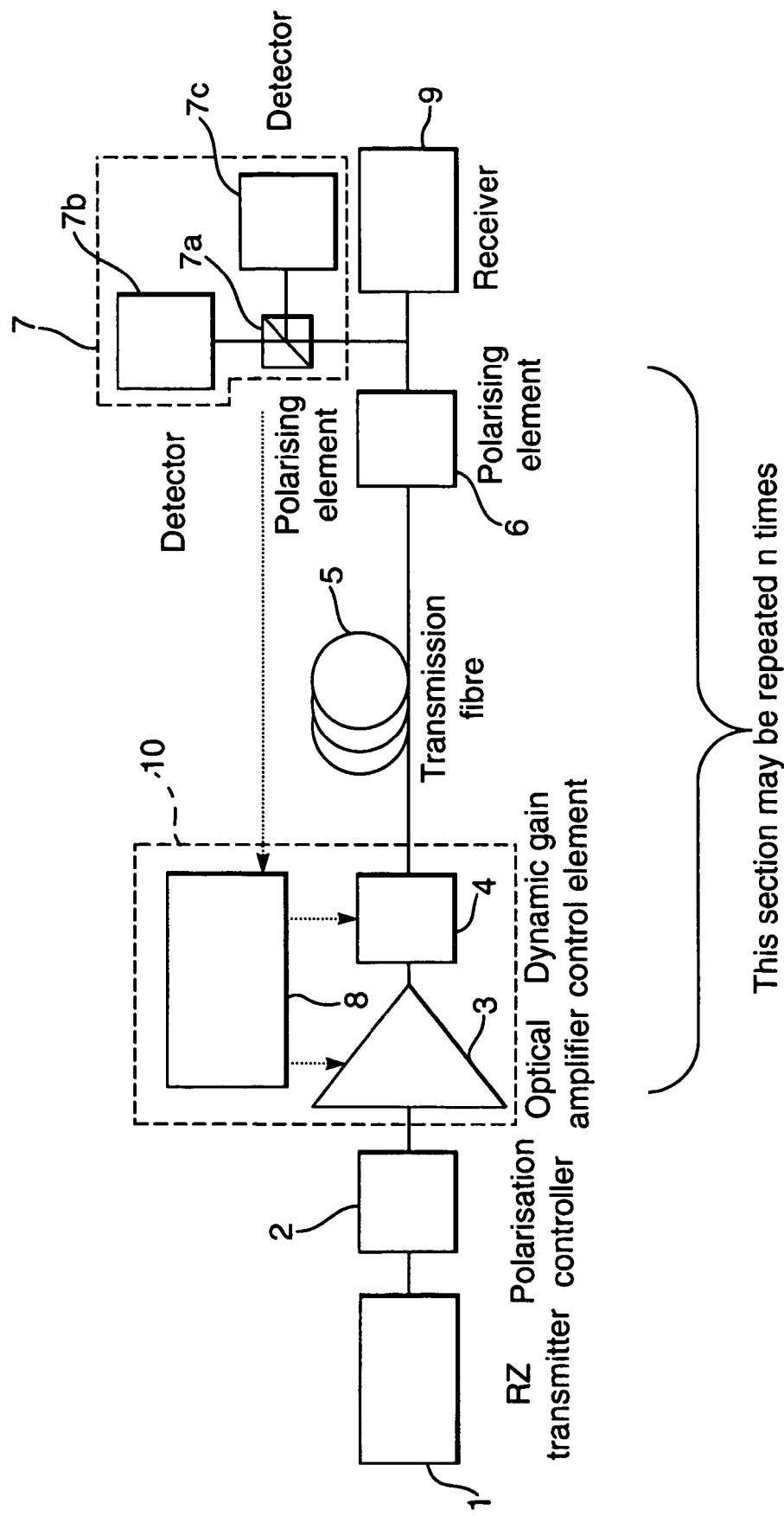

SIGNAL TRANSMISSION APPARATUS AND A METHOD OF SIGNAL TRANSMISSION

The invention relates to signal transmission apparatus and a method of signal transmission, especially optical signal transmission apparatus and a method of optical signal transmission.

Signals travelling in an optical fibre experience a rotation of polarisation arising from the natural birefringence of the optical fibre. In wavelength division multiplexed (WDM) signal transmission in an optical fibre, the optical signals are rotated in polarisation at different rates. An additional polarisation rotation effect, which is non-linear and due to the Kerr effect, is also present and results in instantaneous changes in the refractive index in one polarisation and, hence, the birefringence, of the optical fibre, depending on the power of the optical signal.

An object of the present invention is the control of the extent of rotation of the polarisation of the signals in a signal transmission cable such as an optical fibre in WDM transmission, reducing transmitted noise.

The invention provides signal transmission apparatus including:

a signal source capable of generating a plurality of polarised signals having different wavelengths, controllable gain-control means, including a dynamic filter capable of differential adjustment of the amplitudes of the signals, having a signal-input port connected to receive signals from the signal source and a signal-output port for delivering an amplitude-controlled signal, the controllable gain-control means having a control-input port through which the gain of the dynamic filter is adjustable for respective ones of the plurality of signals, a length of signal transmission cable including an input port at one end and an output port at the other end, the input port of the length of signal transmission cable being connected to receive signals from the signal-output port of the controllable gain-control means, the length of signal transmission cable, in operation, changing the polarisation of signals passing through it in accordance with the amplitudes and wavelengths of the signals, a polarising element having a signal-input port connected to receive signals from the output port of the length of transmission cable and a signal-output port for delivering, to a receiving device, signals conveyed from the length of transmission cable and a signal monitoring device capable of determining the respective states of polarisation of a plurality of signals present at its signal-input port which is connected to receive signals from the signal-output port of the polarising element, the signal monitoring device having an output port connected to deliver, to the control-input port of the controllable gain-control means, the result of the determination which, in operation, it makes for the signals it receives the signal monitoring device and the controllable gain-control means so operating together as to move the polarisation states of the signals, by controlling the amplitudes of the signals as they pass through the controllable gain-control means, towards alignment with the low-loss axis of the polarising element.

Preferably, the controllable gain-control means includes an intermediate power control device having an input port which serves as the control-input port of the of the controllable gain-control means, an optical amplifier and a dynamic gain control element which includes the dynamic filter, the intermediate power control device being connected to control the optical amplifier and the dynamic gain control element in accordance with the signals received from the signal monitoring device.

Preferably, the polarising element is a polarising element for which attenuation on the high-loss axis is greater, but not substantially greater, than attenuation on the low-loss axis, preferably, the length of transmission cable is a length of optical transmission cable and, preferably, the signal source is capable of generating return-to-zero signals.

The signal transmission apparatus may include:

a further length of signal transmission cable including an input port at one end and an output port at the other end, a further controllable gain-control means having a signal input port connected to receive signals from the signal-output port of the polarising element and a signal-output port for delivering further amplitude-controlled signals to the input port of the length of signal transmission cable, the further controllable gain-control means having a control-input port, a further polarising element connected to receive signals from the output port of the further length of signal transmission cable and a further signal monitoring device capable of determining the respective states of polarisation of a plurality of signals present at its signal-input port which is connected to receive signals from the signal-output port of the further polarising element, the signal monitoring device having an output port connected to deliver, to the control-input port of the further controllable gain-control means, the result of the determination which, in operation, it makes for the signals it receives The invention also provides a method of transmitting a plurality of polarised signals having different wavelengths through a signal transmission cable which changes the polarisation of the signals in correspondence with their amplitudes and wavelengths, including the steps of providing dynamic filter capable of differential adjustment of the amplitudes of the signals and a polarising element in series with the signal transmission cable, and so adjusting the amplitudes of the different wavelength signals, at the dynamic filter, that the polarisation states of the signals move towards alignment with the low-loss axis of the polarising element.

Preferably, the method includes the step of monitoring the states of polarisation of the signals leaving the polarising element and controlling the amplitudes of the signals at the dynamic filter in accordance with the results of the monitoring step.

Preferably, the method includes the steps of generating return-to-zero signals (RZ) signals and transmitting the RZ signals.

A signal transmission apparatus and a method of signal transmission in accordance with the invention will now be described, by way of example only, with reference to the accompanying drawing which shows an optical WDM transmission apparatus.

Referring to the accompanying drawing, the signal transmission apparatus includes a transmitter 1 connected to supply optical signals to a polarisation controller 2. The polarisation controller 2 is connected to supply signals to a signal-input port of an optical amplifier 3, the signal-output port of which is connected to supply signals to a signal-input port of a dynamic gain control element 4. The dynamic gain control element 4 has an output port which is connected to the input port of a length of optical fibre cable 5, the output port of which is connected to a signal-input port of a polarising element 6. The polarising element 6 has a signal-output port which is connected to a signal-input port of a receiver 9. The output port of the polarising element 6 is also connected to a signal-input port of a signal-monitoring device 7 which is capable of monitoring the state of polarisation of the signals which it receives from the polarising element 6 and the output port of the monitoring device 7 is connected to an input port of an intermediate power control device 8. The intermediate power control device 8 has a first output port connected to a control input port of the dynamic gain element 4 and a second output port connected to a control input port of the optical amplifier 3, to complete the signal transmission apparatus.

The optical amplifier 3, the dynamic gain control element 4 and the intermediate power control device 8 function as a controllable gain-control means 10 and includes a dynamic filter capable of differential adjustment of the amplitudes of the signals. The control input port of the intermediate power control device 8 serves as the control input port of the controllable gain-control means 10 and the gain of the dynamic filter is adjustable for respective ones of the plurality of signals, through the control input port. The intermediate power control device 8 is an electrical circuit and the connections to and from it are purely electrical. The gain of the controllable gain-control means 10 is, in fact, a controllable wavelength-dependent loss.

The signal-monitoring device 7 includes a polarisation-splitting element 7a and power monitors 7b and 7c which detect the power in the two planes of polarisation into which the light is split. The two planes of polarisation referred to correspond to the low-loss and high-loss axes, respectively, of the polarising element 7.

In the operation of the signal transmission apparatus, the transmitter 1 generates a plurality of optical signals at different wavelengths which are subjected to controlled polarisation by the polarisation controller 2 which is downstream of the transmitter 1. The signals pass from the polarisation controller 2 to the optical amplifier 3 which amplifies the signals. The transmitter 1 and the polarisation controller 2 serve as a source of polarised signals having different wavelengths and of adjustable polarisation for providing signals within the dynamic range of the remainder of the apparatus. The signals pass from the optical amplifier 3, which provides a controllable gain, to the dynamic gain control element 4 which provides a controllable wavelength-dependent loss, the amplitudes of the signals being adjusted in the amplifier 3 and the dynamic gain control element 4 in accordance with a control signal applied by the intermediate power control device 8 to the control-input ports of the amplifier 3 and the dynamic gain control element 4. The control signal provided by the intermediate power control element 8 is developed from the signal provided by the signal monitoring device 7 and is such that the amplitudes of the plurality of signals conveyed by the dynamic gain control element 4 are adjusted to cause the polarisation states of the signals to move towards being aligned with the low-loss axis of the polarising element 6. The amplitude-adjusted signals leave the dynamic gain control element 4 and enter the length of optical transmission cable 5 in which the plane of polarisation of an optical signal is subjected to rotation in accordance with the square of the amplitude of the optical signal before reaching the polarising element 6. The signal monitoring device 7 examines the signals at the output port of the polarising device 6 along the low-loss and high-loss axes of the polarising element 6 and provides signals to the intermediate power control device 8, for effecting the amplitude control of the signals passing through the amplifier 3 and the dynamic gain control element 4. The signals leaving the polarising element 6 are also available to the receiver 9.

The dynamic gain control element 4 serves to provide a controllable wavelength-dependent loss for the signals and may be realised in the form of a dynamic gain flattening filter (DGFF) so operating as to adjust the amplitudes of the signals in accordance with the control signal provided by the intermediate power control device 8. A device suitable for inclusion in the dynamic gain control element 4 is described under the heading "Liquid-Crystal Optical Harmonic Equalizers" in Paper We.P.38 of the conference ECOC-01 held in Amsterdam.

The polarising element 6 is a weak polarising element, transmitting signals on its high-loss axis with greater, but not substantially greater, attenuation than signals on its low-loss axis. Signals should be detectable on both the high-loss and low-loss axes of the polarising element 6 and that requirement, in effect, determines the extent to which the element 6 is a polarising element.

The signal monitoring device 7 monitors the power of the signals and separates the signal energy into two planes of polarisation, one polarisation aligned with the low-loss axis of the polarising element 6 and the other polarisation aligned with the high-loss axis of the polarising element 6. The energy in both planes of polarisation is recorded and the state of polarisation of the signals is determined for the provision of the signal to the intermediate power control device 8.

The signals are, preferably, return-to-zero (RZ) signals for which the signal transmission apparatus is especially suitable in that there is provision of noise reduction. The apparatus permits the plane of polarisation of the high-amplitude signal pulses to be aligned with the low-loss axis of the polarising element 6 whereas any accompanying noise, which is at a relatively low amplitude, is aligned with the high-loss axis of the polarising element 6 and is suppressed.

Through appropriate use of the polarisation and amplitude control, optical data-carrying return-to-zero signals may be made to propagate over vast distances without appreciable loss of data. As a result of non-linear polarisation rotation, whereby the polarisation of a signal rotates as it passes down the optical fibre 5 in proportion to the square of its amplitude (NPR), high-intensity pulses are rotated by a different amount from the low-intensity noise. By using the weak polariser 6 and the polarisation controller 2, the signal is so aligned that the signal pulses pass through the polariser 6 in a state of low attenuation and the majority of the noise is subjected to higher attenuation. In that way, the noise is suppressed and only the signal passes.

Not only is the optical signal to noise ratio (OSNR) improved but, by suppressing the noise, Gordon-Haus jitter is also reduced. Additionally, as the polarisation rotation in the optical cable 5 is proportional to the square of the amplitude, the pulse is reshaped, providing additional robustness to polarisation mode dispersion (PMD) and chromatic dispersion. In effect, the optical cable 5 behaves as a saturable absorber. The amount of static gain rotation will fluctuate over time due to mechanical and thermal effects, and so the launch power required to pass through the element in the correct state must be controlled dynamically from the polarising element 6 located at the receiver 9 (which may be at a remote location) or by a plurality of polarising elements positioned periodically along the transmission line. The control is effected by taking a tap from the optical signal and monitoring the power on both arms of the polarising beam splitter 7a, one arm aligned with the low loss axis of the polarising element. By recording the total power on both arms and the ratio between the power in each arm, the state of polarisation of the signal channels is ascertained and fed back to the transmitter end.

The wavelengths are rotated at different rates, in the wavelength division multiplexed (WDM) system, as the signals propagate along the optical cable 5 and is dealt with by controlling the amplitudes of individual channels on a channel by channel basis. This is achieved simply and cheaply by using a dynamic gain-flattening filter (DGFF). Instead of attempting to flatten the amplitude profile of the signal, the DGFF so adjusts the amplitudes of the signals as to align the channels to the polarisation states of the polarising element 6.

The overall length of the signal transmission line included in the signal transmission apparatus may be provided by a plurality of lengths of optical cable with respective controllable gain-control means, polarising elements and signal monitoring devices connected, in series with one another.

The invention is applicable to all signals in cases where the plane of polarisation of the signal is rotated by a transmission cable along which the signal travels.

The invention claimed is:

1. A signal transmission apparatus, comprising:
   a) a signal source for generating a plurality of polarized signals having amplitudes and different wavelengths;
   b) controllable gain-control means, including a dynamic filter for differential adjustment of the amplitudes of the polarized signals, having a signal-input port connected to receive signals from the signal source and a signal-output port for delivering amplitude-controlled signals, the controllable gain-control means having a control-input port through which a gain of the dynamic filter is adjustable for respective ones of the plurality of polarized signals;
   c) a length of signal transmission cable including an input port at one end and an output port at another end, the input port of the length of signal transmission cable being connected to receive signals from the signal-output port of the controllable gain-control means, the length of signal transmission cable, in operation, changing polarization of the polarized signals passing through it in accordance with the amplitudes and wavelengths of the polarized signals;
   d) a polarizing element having a signal-input port connected to receive signals from the output port of the length of transmission cable and a signal-output port for delivering, to a receiving device, signals conveyed from the length of transmission cable;
   e) a signal monitoring device for determining respective states of polarization of the plurality of polarized signals present at its signal-input port which is connected to receive signals from the signal-output port of the polarizing element, the signal monitoring device having an output port connected to deliver, to the control-input port of the controllable gain-control means, a result of a determination which, in operation, it makes for the signals it receives; and
   f) the signal monitoring device and the controllable gain-control means so operating together as to move the polarization states of the polarized signals, by controlling the amplitudes of the polarized signals as they pass through the controllable gain-control means, towards alignment with a low-loss axis of the polarizing element.

2. The signal transmission apparatus as claimed in claim 1, wherein the controllable gain-control means includes an intermediate power control device having an input port which serves as the control-input port of the controllable gain-control means, an optical amplifier and a dynamic gain control element which includes the dynamic filter, the intermediate power control device being connected to control the optical amplifier and the dynamic gain control element in accordance with the signals received from the signal monitoring device.

3. The signal transmission apparatus as claimed in claim 1, wherein the polarizing element has attenuation on a high-loss axis which is greater, but not substantially greater, then attenuation on the low-loss axis.

4. The signal transmission apparatus as claimed in claim 1, wherein the signal transmission cable is an optical transmission cable.

5. The signal transmission apparatus as claimed in claim 1, wherein the signal source is operative for generating return-to-zero signals.

6. The signal transmission apparatus as claimed in claim 1, and further comprising:
   a further length of signal transmission cable including an input port at one end and an output port at another end;
   a further controllable gain-control means having a signal input port connected to receive signals from the signal-output port of the polarizing element and a signal-output port for delivering further amplitude-controlled signals to the input port of the length of signal transmission cable, the further controllable gain-control means having a control-input port;
   a further polarizing element connected to receive signals from the output port of the further length of signal transmission cable; and
   a further signal monitoring device for determining the respective states of polarization of the plurality of polarized signals present at its signal-input port which is connected to receive signals form the signal-output port of the further polarizing element, the signal monitoring device having an output port connected to deliver, to the control-input port of the further controllable gain-control means, a result of a determination which, in operation, it makes for the signals it receives.

7. A method of transmitting a plurality of polarized signals having amplitudes and different wavelengths through a signal transmission cable which changes polarization of the polarized signals in correspondence with their amplitudes and wavelengths, comprising the steps of:
   a) providing a dynamic filter capable of differential adjustment of the amplitudes of the polarized signals and a polarizing element in series with the signal transmission cable; and
   b) adjusting the amplitudes of the polarized signals, at the dynamic filter, so that polarization states of the signals move towards alignment with a low-loss axis of the polarizing element.

8. The method as claimed in claim 7, including the step of monitoring the states of polarization of the polarized signals leaving the polarizing element and controlling the amplitudes of the polarized signals in accordance with results of the monitoring step.

9. The method as claimed in claim 7, including the steps of generating return-to-zero signals (RZ) signals and transmitting the RZ signals.

* * * * *